Sept. 13, 1932.   G. M. BEARD   1,877,622
WIND MOTOR
Filed May 25, 1931   3 Sheets-Sheet 1
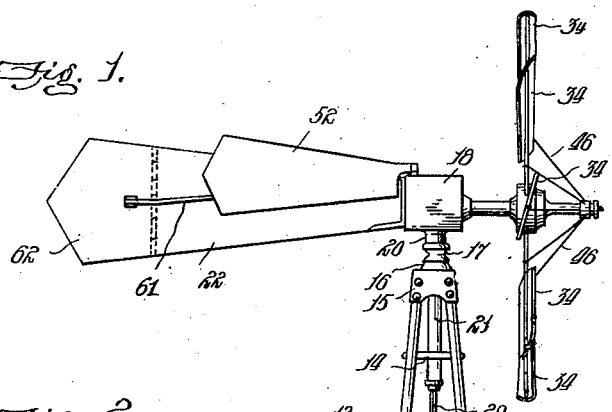
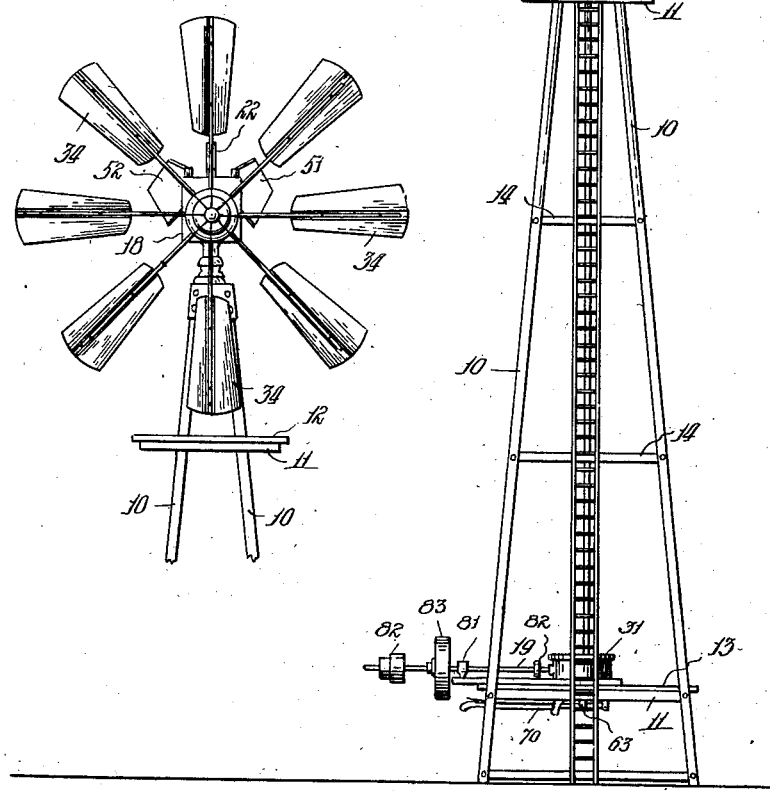

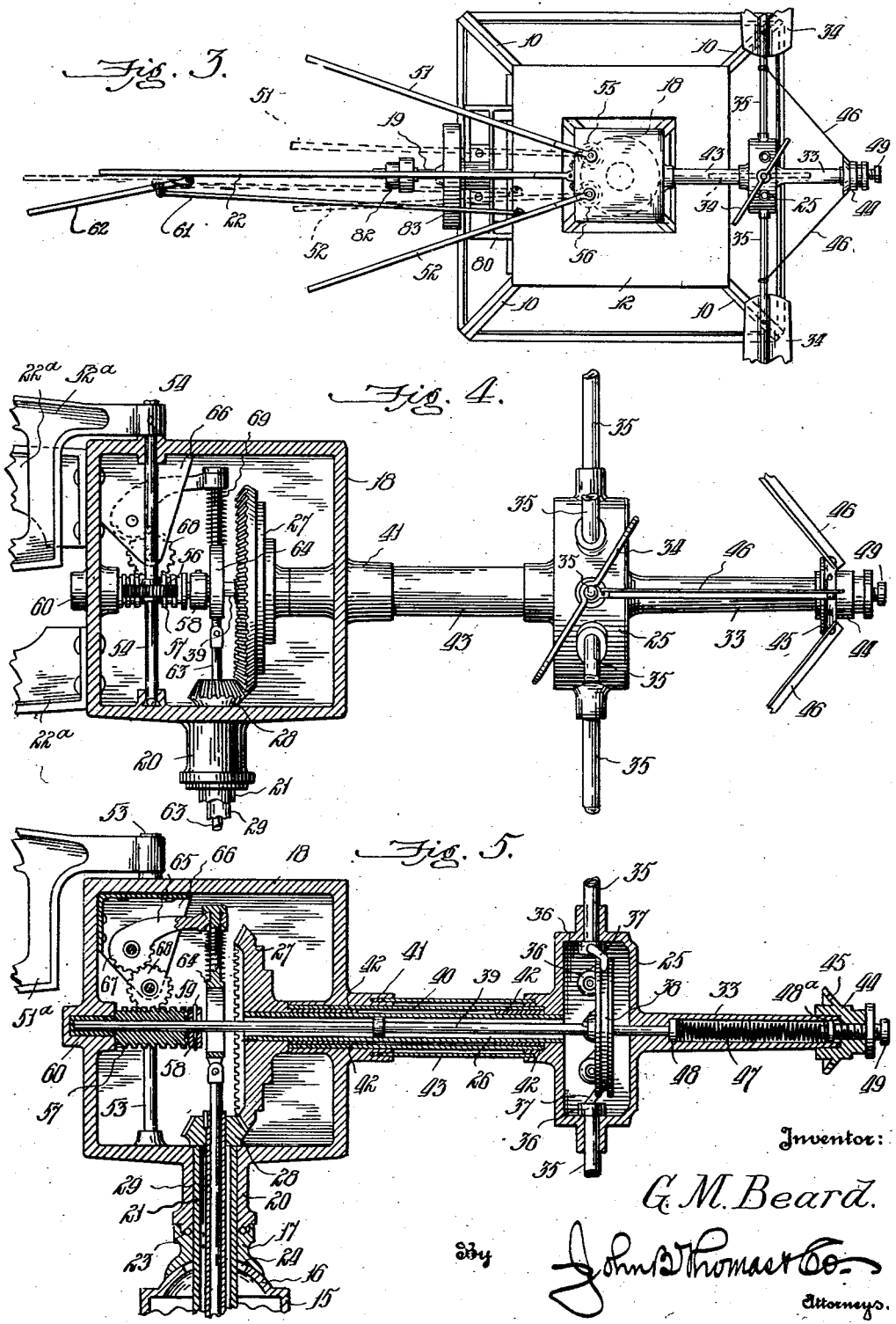

Sept. 13, 1932.   G. M. BEARD   1,877,622
WIND MOTOR
Filed May 25, 1931   3 Sheets-Sheet 3
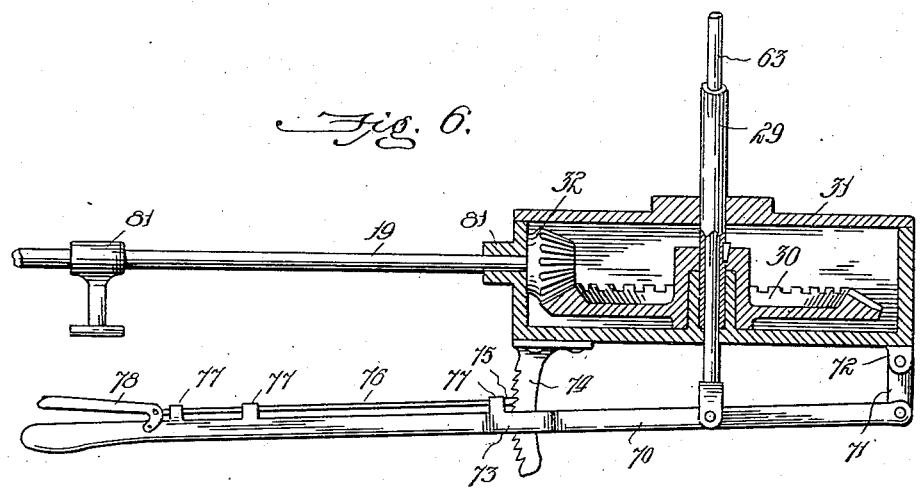
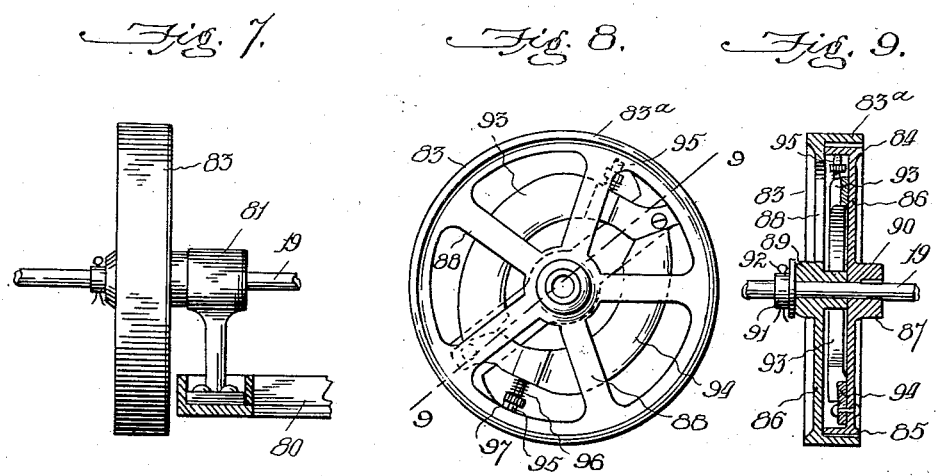
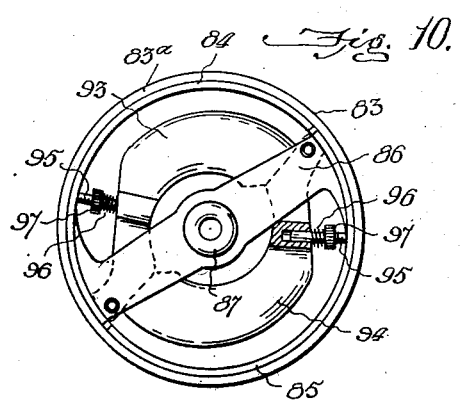

Patented Sept. 13, 1932

1,877,622

UNITED STATES PATENT OFFICE

GEORGE M. BEARD, OF AUBURN, INDIANA

WIND MOTOR

Application filed May 25, 1931. Serial No. 539,927.

My invention is an improvement in wind motors for operating pumps, machinery, etc., and relates more especially to that particular type in which the wind wheel is put in and out of operation by having the blades turnable on the hub so as to present more or less surface to the wind currents for turning the wheel or stopping the same according to the strength of the wind, the speed of the wheel as well as the stopping of the same being regulated by vanes connected to the spindles carrying the blades.

The primary object of my invention is to provide a wind motor of this general character by which the power derived from the wind wheel at the top of the tower is transmitted to a shaft at the bottom of the tower, said power driven shaft carrying a variable speed pulley for operating an electric generator usable in lighting, cooking, etc., with additional pulleys on the shaft for operating a pump, saw mill, and other domestic apparatus.

A further object of my invention is to provide a simple and effective mechanism for regulating the turning of the wind wheel either automatically through the intervention of the governor vanes connected to the blades or manually at the lower end of the tower, the means for manually throwing the wind wheel blades out of operation also providing for regulating the operation of the governor vanes or wind pressure required for turning the same.

With these principal objects in view my invention consists in the construction and arrangement of parts constituting my improved wind motor, as hereinafter fully described and more specifically set forth in the appended claims.

In the drawings:

Figure 1 is an elevation of the wind motor.

Fig. 2 is a front view of the wind wheel and upper part of the tower.

Fig. 3 is a plan view.

Fig. 4 is an enlarged sectional view of the housing at the top of the tower to show the mechanism enclosed therein.

Fig. 5 is a longitudinal sectional view of Fig. 4.

Fig. 6 is a sectional view of the box enclosing the gears at the lower end of the tower and including the manually operated lever for regulating the turning of the blades of the wind wheel.

Figs. 7 to 10 are detail views of the variable speed pulley, Fig. 9 being a sectional view on the line 9—9 of Fig. 8.

In carrying out my invention I employ any conventional form of tower preferably of the construction shown in the drawings in which the corner posts 10 are of angle iron connected at intervals by bracing members 11, 11 supporting platforms 12 and 13 at the upper and lower portions of the tower and with additional bracing members 14 as desired for the stability of the structure. In the present instance the upper end of the tower is provided with a rectangular cap 15 fastened to the corner posts and having a dome 16 supporting a base or table 17 on which turns the housing 18 carrying the wind wheel and mechanism for transmitting the power derived therefrom to an operating shaft 19 at the bottom of the tower, said housing being supported on the table by a depending hollow standard 20 from which extends a hollow post 21 for a suitable distance below the cap. As will be noted by reference to Fig. 5 the housing is rotatable on the base or table 17 so that the wind wheel carried thereby may be brought into position to face the wind by means of the rudder 22 secured to the housing at the opposite side thereof from the wind wheel, and in order that the housing may turn freely ball bearings 23 are interposed between the standard 20 and table 17, while the opening 24 through the cap in cooperation with the seating of the table on the dome permits of the required lateral play.

The hub 25 of the wind wheel hereinafter particularly described is connected to a hollow horizontal shaft 26 extending through one side of the housing and carrying a beveled gearwheel 27 at the inner end thereof in mesh with a pinion 28 keyed to the upper end of a tubular vertical shaft 29 extending downwardly through the hollow post 21 and center of the tower for transmitting the power of the wind wheel to a large beveled gearwheel 30 (Fig. 6) mounted in a gearing box 31 supported on the platform 13, the last mentioned gearwheel meshing with a pinion 32 at the inner end of the horizontal shaft 19 from which the power is taken for driving a pump, electric generator, etc. The wind wheel consists of blades 34 secured to the outer ends of spindles 35 passing through the hub and having collars 36 at the inner end thereof from which project crank arms 37 for turning the blades, said crank arms being operated by a grooved wheel 38 keyed to a rod 39 extending through the hollow shaft 26 and to which a sliding movement is imparted in the manner hereinafter described. To relieve the hollow shaft from the weight of the wind wheel there is a sleeve 40 extending between the hub 25 and bearing 41 on the housing with bushings 42, 42 interposed between said sleeve and tubular shaft, these parts being protected by a circular casing 43, and for bracing the blades of the wind wheel as well as to provide a bearing for the sliding rod 39 the hub of the wind wheel has a forward extension 33 on the outer end of which is fixed a cap 44 with an inwardly projecting circumferential flange 45 for attachment thereto of the angle iron brace rods 46 extending to the spindles of the blades. The forward extension of the hub also serves to enclose a spring 47 bearing at its inner end against a collar 48 at the outer end of the sliding rod 39 and at its outer end against a flanged plug 48a adjusted by a set screw 49 for regulating the tension of said spring, the latter serving to actuate the sliding rod in one direction or to move the grooved wheel 38 in the direction to turn the blades normally into the wind. The blades are turned to present less surface to the wind for decreasing the speed of the wind wheel, and with their edges to the wind for stopping the wind wheel, by means of vanes 51, 52 at opposite sides of the rudder 22, said vanes being connected to vertical shafts 53, 54 extending through the housing and carrying pinions 55, 56 in mesh with a circumferential toothed sleeve 57 mounted on the inner end of the sliding rod 39 against a collar 58 keyed to said rod by pin 59, it being noted by reference to Fig. 5 that the rod is supported at its inner end in a bearing 60 formed on the rear wall of the housing.

As hereinbefore explained the sliding rod 39 is operated against the action of the spring 47 to turn the blades out of the wind to a more or less extent by means of the governor vanes 51, 52 through the intervention of the vertical shafts 53, 54 and pinions 55, 56 shifting the circumferentially toothed sleeve 57 which actuates said sliding rod to move the grooved wheel with which the crank arms on the inner end of the spindles of the blades engage, this operation being automatic according to the strength of the wind against the vanes, the pressure of the wind also acting against the rudder to keep the face of the wind wheel towards the wind, and as the vanes are both geared to the sliding sleeve 57 they act in unison. To increase the effective operation of these vanes, and more especially to retain the wind wheel in proper relative position with the direction of the wind, a wing 62 is pivoted near the outer end of the rudder 22 at one side thereof and connected by a rod 61 to one of the governor vanes, as 52, whereby wind pressure against said wing will cooperate with the governor vanes, as hereinafter described, as well as cooperate with the rudder to bring the wind wheel in proper position with respect to the currents of air striking the blades.

For manually operating the blades of the wind wheel from the bottom of the tower without interfering with the automatic operation by means of the governor vanes a rod 63 is extended upward through the tubular shaft 29 and connected at its upper end by an interposed yoke 64 to a lever 65 pivoted in a bracket 66 bolted in the top of the housing and having a toothed segment 67 in mesh with a pinion 68 also supported by the bracket and engaging the circumferentially toothed sliding sleeve 57 at the upper side thereof. As will be noted the yoke 64 is pivoted to the upper end of the rod 63 and is for the purpose of passing around the sliding rod 39 which is on a line with said operating rod 63, and the gearing between the lever 65 and sleeve 57 is such that when the rod is pulled downwardly the sleeve is pushed forwardly against the action of the spring 47 to turn the blades in the same manner as do the governor vanes when the wind pressure is strong enough to operate said vanes. The rod 63 which is connected by pivoted yoke 64 to the lever 65 extends below the tubular shaft 29 beyond the bottom of the casing 31 enclosing the gears 30, 32 and is connected at its lower end to a hand lever 70 for operating the same, said lever being pivoted at one end to a link 71 depending from an ear 72 on the bottom of the casing and is provided with a loop 73 through which passes a segment rack 74 engaged by a sliding pawl 75 at the inner end of a rod 76 slidable in lugs 77 on the lever and connected to a bent lever 78 pivoted to the hand lever at one side of the gripping portion thereof, whereby the position of the blades of the wind wheel with respect to the surfaces presented for the action of the wind currents may be manually regulated by the operation of the hand lever. In order that this operation will not interfere with the operation of the blades by means of the governor vanes the upper end of said rod or extension beyond the yoke portion thereof extends through an opening in the outer end of lever 65 and is provided with a head 79, thus permitting free downward movement of the outer end of said lever 65 when the sliding sleeve 57 is shifted by the governor vanes; that is to say, in the normal raised position of the hand lever and under normal conditions of the wind the sliding of the sleeve 57 forwardly by means of the governor vanes will not be affected by the locking of the operating rod 63 in its raised position. In cooperation with this arrangement for manually operating the blades of the wind wheel I interpose a tension spring 69 between the outer end of the lever 65 and shoulder formed by the upper portion of the yoke 64, and it will be obvious by reference to Fig. 4 that the lifting of the rod beyond the normal position shown in said figure will compress the spring according to the extent to which said rod is lifted thereby requiring more wind pressure against the governor vanes in operating the same inasmuch as the lever 65 now under tension of the spring is geared to the sliding sleeve actuated by said vanes, thus serving to regulate the automatic operation of the blades of the wind wheel.

It will be understood that the power of the wind motor which is transmitted to the horizontal shaft 19 supported in a metal frame 80 and bearings 81 on platform 13 at the bottom of the tower may be utilized for operating a pump and other machines or apparatus, for which purpose said shaft is provided with a band pulley or pulleys 82, but as my improved wind motor is designed for the special purpose of operating a generator for supplying electric current for domestic use said shaft carries a variable pulley 83 illustrated in Figs. 7 to 10 of the drawings.

The variable pulley consists of a main wheel, with an outer continuous rim 83a over which passes the belt (not shown) for transmitting the power to the electric generator, and an inner wheel with a two-part rim 84, 85 the opposite ends of which latter are connected by a crosspiece 86 having a hub 87, while the rim of the main wheel is connected by spokes 88 to a hub 89 at one side of the hub 86, the main wheel being loose on the shaft 19 while the inner wheel is connected thereto by key 90 and said wheels retained in relative position by means of the bearing 81 and collar 91 secured to the shaft by cotter-pin 92. The two-part rim of the inner wheel, fixed to the shaft by the hub of the crosspiece, is expanded for frictional engagement with the inner side of the rim of the outer wheel by the centrifugal action of oppositely disposed weighted members 93 and 94 pivoted at the opposite ends of the crosspiece 86 and each carrying a rod 95, said rods bearings against the rims of the inner wheel adjoining the pivotal connection of the weighted members to the crosspiece and are under tension of a spring 96 interposed between the weighted member and an adjusting nut 97 threaded on the rod.

In the operation of an electric generator it is desirable that it be driven at or above a certain speed, and in the present instance this is provided for by the variable pulley inasmuch as the shaft 19 must be running at such speed as to move the weighted members outwardly by centrifugal force sufficient to cause the spring controlled rods to expand the two-part rim of the inner wheel into frictional engagement with the rim of the outer wheel sufficient to turn said outer wheel for the operation of the electric generator.

In the operation of my improved wind motor with the parts of the mechanism arranged as illustrated in the drawings the currents of air striking against the deflected blades of the wind wheel will turn said wind wheel and through the connection of hollow shaft 26, gearwheel 27, and pinion 28, the tubular shaft 29 will be revolved and drive the shaft 19 at the bottom of the tower for the operation of a generator and other machinery or apparatus, and in case of a storm when the force of the wind attains such velocity that the too rapid turning of the wind wheel would be likely to injure the mechanism pressure of the wind against the governor vanes will move them inward and turn the shafts 53, 54 thereby moving the sleeve 57 and slide the rod 39 and grooved wheel 38 connected thereto for changing the angle of the blades with respect to the wind or bring said blades in line with the wind to stop the turning of the wind wheel. In this manner the operation of the wind wheel is controlled by the governor vanes and the amount of wind pressure required to move these vanes will be determined by the tension of the spring 69 set by the hand lever at the bottom of the tower, as hereinbefore explained, to regulate the speed of the wind wheel, stopping of the latter taking effect when the vanes are at the limit of their inward movement. At any time it should be desired to throw the wind wheel out of operation it is only necessary to operate the hand lever to pull on the connecting rod 63 connected to lever 65 geared to the sleeve 57 and move the latter to slide the rod 39 and grooved wheel 38 so as to shift the blades in line with the wind. It will thus be seen that I provide a wind motor that will automatically throw the wind wheel out of operation during a storm thus preventing injury to the mechanism and increasing the life of the wind motor, and by employing the variable band pulley in connection with the ordinary pulleys the power of the shaft 19 can be utilized to operate a pump or other machinery and when the shaft attains a predetermined speed the variable pulley will operate the electric generator. Furthermore, it will be obvious that by the provision of wing 62 pivoted to near the outer end of the rudder and deflected from one side thereof by its connection to one of the governor vanes this wing not only serves to retain the wind wheel in proper position with respect to the direction of the wind in operating said wind wheel but its connection to the governor vane allows the tension spring 69 to also act on said wing; that is to say there is a cooperation between this wing and the governor vane for the purpose not only of keeping the wind wheel into the wind but to also assist in turning the blades according to the strength of the wind.

I claim:

1. In a wind motor the combination with a tower, a housing rotatably mounted on the tower, and a rudder secured to the housing, of a hollow shaft journaled in the housing and having a wind wheel at its outer end with rotatable blades and means for turning the same, a tubular vertical shaft geared to the hollow shaft and extending to the bottom of the tower, a rod slidable in the hollow shaft for operating the rotatable blades, governor vanes mounted on the housing, and means responsive to the movement of the governor vanes for sliding the rod; together with a lever pivoted in the housing for sliding the aforesaid rod independently of the governor vanes, a vertical rod extending through the tubular shaft, a yoke connecting the upper end of the rod to the lever and through which yoke the aforesaid slidable rod passes, a spring interposed between the lever and yoke for exerting tension on the lever and sliding rod operated thereby, and means for adjusting the vertical rod with respect to the lever and compression spring.

2. In a wind motor the combination with a tower, a housing rotatably mounted on the tower, and a rudder secured to the housing, of a hollow shaft journaled in the housing and having a wind wheel at its outer end with rotatable blades and means for turning the same, a tubular shaft geared to the hollow shaft and extending to the bottom of the tower, a rod slidable in the hollow shaft for operating the rotatable blades, governor vanes mounted on the housing, and means responsive to the movement of the governor vanes for sliding the rod; together with a lever pivoted in the housing for sliding the aforesaid rod independently of the governor vanes, a rod extending through the tubular shaft, a yoke connecting the upper end of the rod to the lever and through which yoke the aforesaid slidable rod passes, a spring interposed between the lever and yoke for exerting tension on the lever and sliding rod operated thereby, a hand lever connected to the lower end of the last mentioned rod, and a rack and pawl for holding the lever in adjusted position.

3. In a wind motor the combination with a tower, a housing rotatably mounted on the tower and carrying a wind wheel having rotatable blades, a rod and means responsive to the movement thereof for turning the blades of the wind wheel, and governor vanes connected to the rod for operating the same by wind pressure, of means for exerting a spring tension on the aforesaid rod consisting of a lever pivoted in the housing and connected to the rod, an operating rod slidably connected to the outer end of the lever and having a shoulder spaced from said lever, said last mentioned rod extending downwardly through the tower to the ground, a spring interposed between the lever and shoulder on the rod, a hand lever connected to the lower end of the rod extending through the tower, and a pawl and ratchet device for holding the hand lever and rod in an adjusted position for regulating the spring tension on the lever connected to the rod operated by the governor vanes.

4. In a wind motor the combination with a tower, a housing rotatably mounted thereon, a rudder secured to and projecting from the housing, a wind wheel mounted on the tower at the opposite side thereof from the rudder, said wind wheel having rotatable blades, a slidable rod and means responsive to the movement thereof for turning the blades of the wind wheel, and governor vanes connected to the rod for operating the same by wind pressure, of means for exerting a spring tension on the aforesaid rod and governor vanes consisting of a lever pivoted in the housing and connected to the rod, a vertical operating rod slidably connected to the outer end of the lever and having a shoulder spaced from said lever, said vertical rod extending downwardly through the tower to the ground, a spring interposed between the lever and shoulder on the rod, and means for adjusting the vertical rod with respect to the lever and compression spring; together with a wing pivoted to near the outer end of the rudder, and a rod connecting said wing to one of the governor vanes for normally deflecting the wing outwardly from the rudder.

GEORGE M. BEARD.